United States Patent [19]
Thompson

[11] Patent Number: 5,165,365
[45] Date of Patent: Nov. 24, 1992

[54] ANT PROOF PET FEEDER APPARATUS

[76] Inventor: Richard C. Thompson, Rte. 2, Box 116-D-20, Trinity, Tex. 75862

[21] Appl. No.: 797,366
[22] Filed: Nov. 25, 1991
[51] Int. Cl.[5] .......................... A01K 5/00; A01K 3/00
[52] U.S. Cl. ........................................ 119/61; 119/121
[58] Field of Search ........................... 119/61, 63, 121; 248/146, 150; 43/122, 132.1, 109, 131

[56] References Cited

U.S. PATENT DOCUMENTS

| | | | |
|---|---|---|---|
| 2,356,022 | 8/1944 | Wright | 43/109 |
| 2,484,263 | 10/1949 | Atkinson | 119/61 |
| 2,772,660 | 12/1956 | Saul | 119/61 |
| 3,202,131 | 8/1965 | Jones | 119/61 |
| 4,966,099 | 10/1990 | Acney | 119/61 |
| 5,042,192 | 8/1991 | Osteen | 43/132.1 |

FOREIGN PATENT DOCUMENTS 37956  9/1927  Denmark .............................. 119/61

Primary Examiner—John J. Wilson
Assistant Examiner—Todd E. Manahan
Attorney, Agent, or Firm—Leon Gilden

[57] ABSTRACT

A pet feeder includes a base, with a removable first and second tube structure arranged to capture a fluid container therebetween for means of replenishment and maintenance of the container in use. A feed dish is mounted upon an upper terminal end of the second tube. A modification of the invention includes replaceable weight members mounted within the base member for ease of disassembly of the structure during transport and storage of the organization.

3 Claims, 4 Drawing Sheets

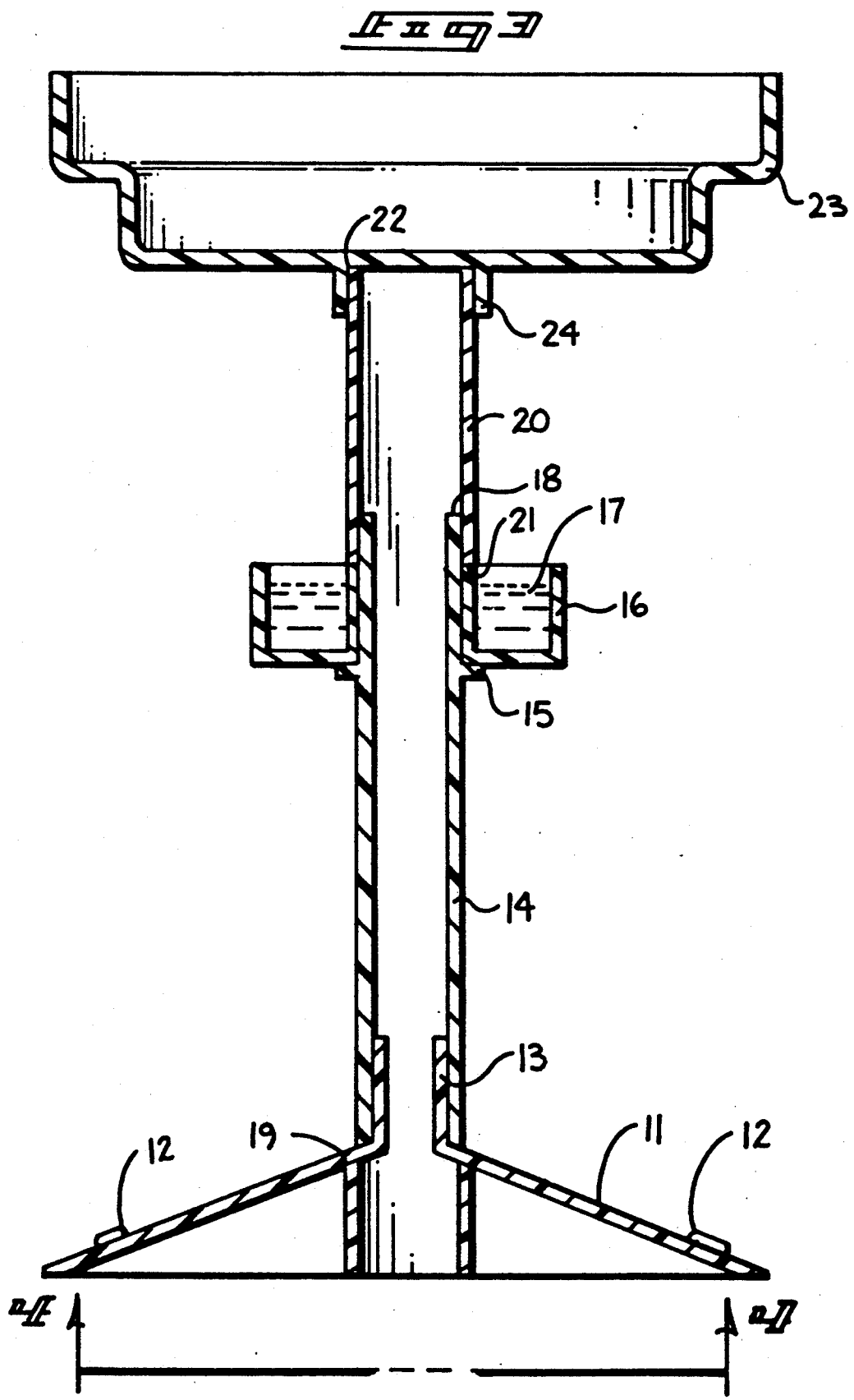

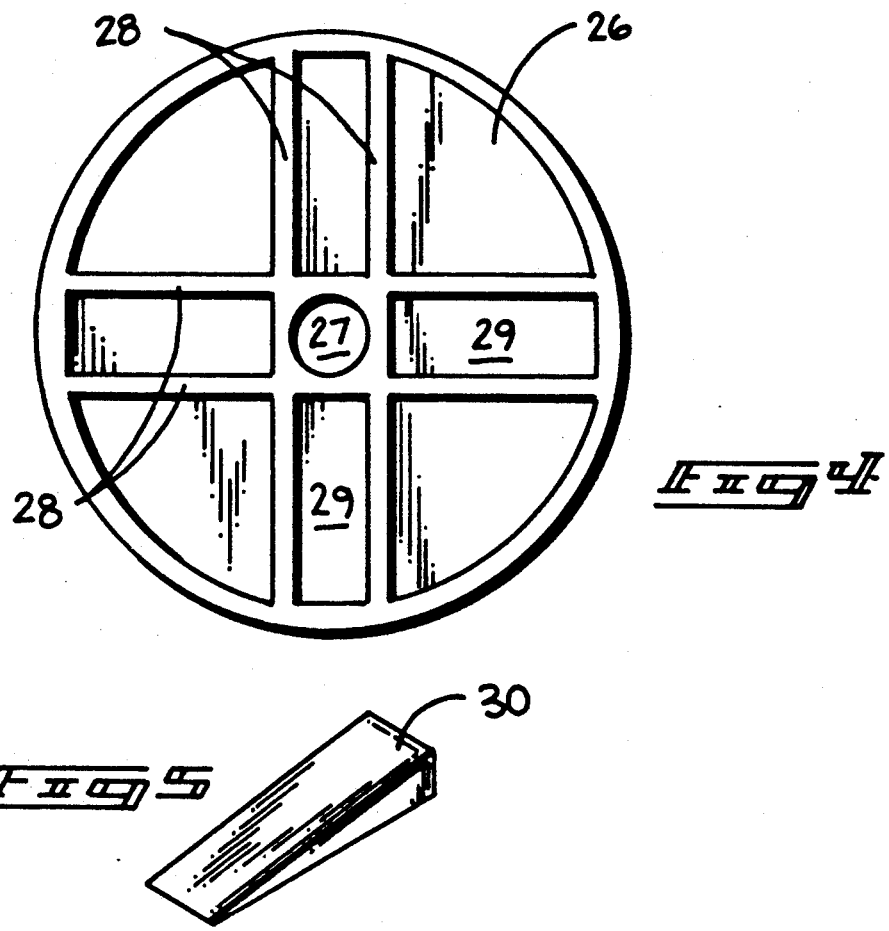
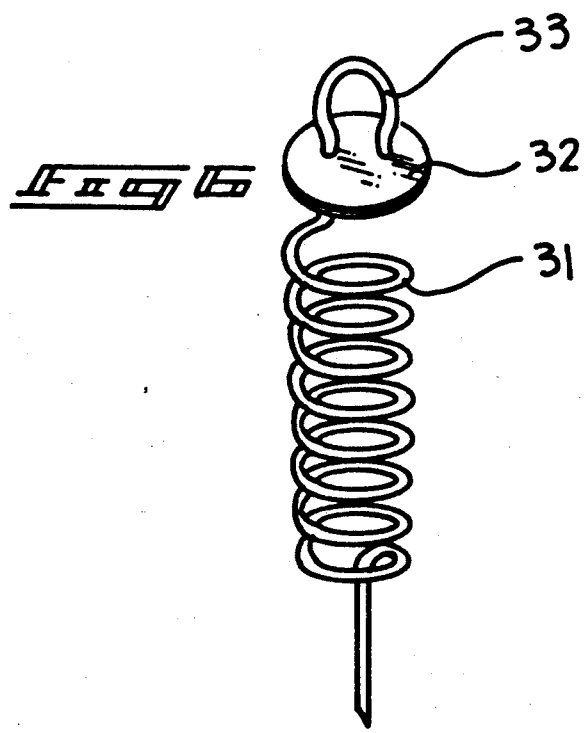

ANT PROOF PET FEEDER APPARATUS

BACKGROUND OF THE INVENTION

1. Field of the Invention

The field of invention relates to food dish apparatus for use by pets, and more particularly pertains to a new and improved ant proof pet feeder apparatus wherein the same is arranged to discourage traverse of ants and other crawling insects to a feed dish of an associated pet feeder structure.

2. Description of the Prior Art

Food bowls and the like for feeding animals, and generally domestic animals, are utilized in the prior art wherein typically means for preventing access by crawling insects by trapping or repulsion of such insects is utilized. Such structure is exemplified in U.S. Pat. No. 4,953,506 to Sanders wherein an upper bowl is removably mounted relative to a lower base containing a bowl structure for containing various insect repulsing components therewithin interconnected by a bayonet type connection.

U.S. Pat. No. 4,896,627 to Riddell set forth an ant proof pet food dish wherein a bowl is mounted within a moat like arrangement of a lower bowl structure.

U.S. Pat. No. 4,357,905 to Carpenter sets forth another example of a pet feeder utilizing a fluid moat to discourage access of crawling insects to the food dish.

U.S. Pat. No. 4,803,954 to Welch, et al. sets forth a further example to discourage crawling insects access to a food bowl structure.

Accordingly, it may be appreciated that there continues to be a need for a new and improved ant proof pet feeder apparatus as set forth by the instant invention which addresses both the problems of ease of use as well as effectiveness in construction in providing a readily assembled and convenient organization not available in the prior art and in this respect, the present invention substantially fulfills this need.

SUMMARY OF THE INVENTION

In view of the foregoing disadvantages inherent in the known types of pet food dish structure now present in the prior art, the present invention provides an ant proof pet feeder apparatus wherein the same utilizes a stacked bowl arranged, wherein a lower bowl is arranged to prevent access of crawling insects relative to an upper bowl structure. As such, the general purpose of the present invention, which will be described subsequently in greater detail, is to provide a new and improved ant proof pet feeder apparatus which has all the advantages of the prior art pet feeder apparatus and none of the disadvantages.

To attain this, the present invention provides a pet feeder including a base, with a removable first and second tube structure arranged to capture a fluid container therebetween for means of replenishment and maintenance of the container in use. A feed dish is mounted upon an upper terminal end of the second tube. A modification of the invention includes replaceable weight members mounted within the base member for ease of disassembly of the structure during transport and storage of the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ant proof pet feeder apparatus which has all the advantages of the prior art pet feeder apparatus and none of the disadvantages.

It is another object of the present invention to provide a new and improved ant proof pet feeder apparatus which may be easily and efficiently manufactured and marketed.

It is a further object of the present invention to provide a new and improved ant proof pet feeder apparatus which is of a durable and reliable construction.

An even further object of the present invention is to provide a new and improved ant proof pet feeder apparatus which is susceptible of a low cost of manufacture with regard to both materials and labor, and which accordingly is then susceptible of low prices of sale to the consuming public, thereby making such ant proof pet feeder apparatus economically available to the buying public.

Still yet another object of the present invention is to provide a new and improved ant proof pet feeder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an orthographic top view of a modified base plate utilized by the invention.

FIG. 5 is an isometric illustration of a replaceable weight structure utilized by the base plate, as illustrated in FIG. 4.

FIG. 6 is an anchor structure illustrated in an isometric view for use by the base member, as set forth in FIG. 4.

DESCRIPTION OF THE PREFERRED EMBODIMENT

Figure 1:
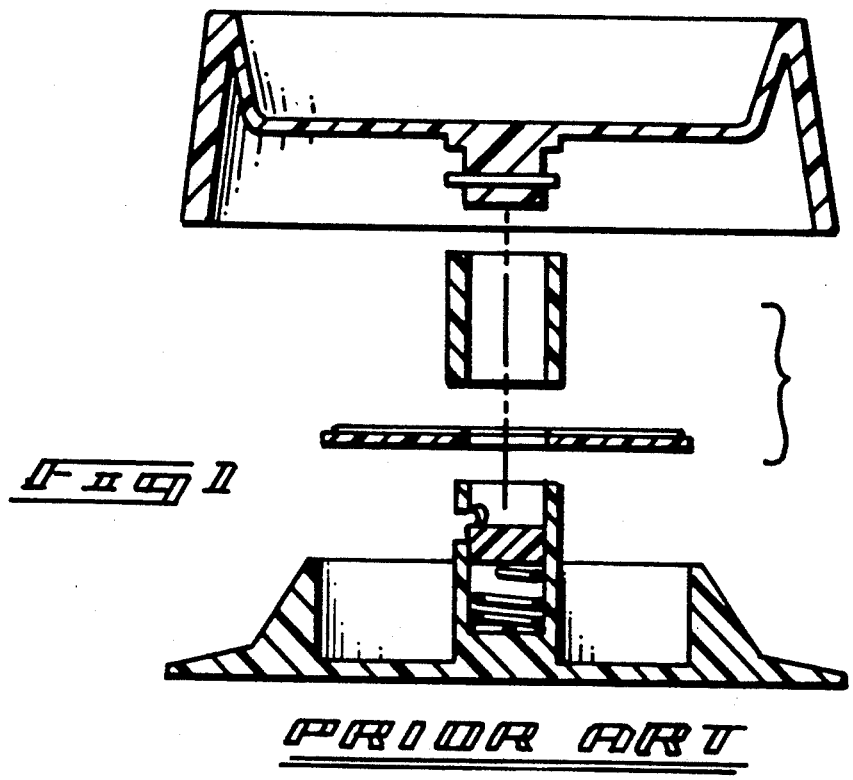
FIG. 1 is an orthographic cross-sectional view of a prior art pet food dish structure.
Figure 2:
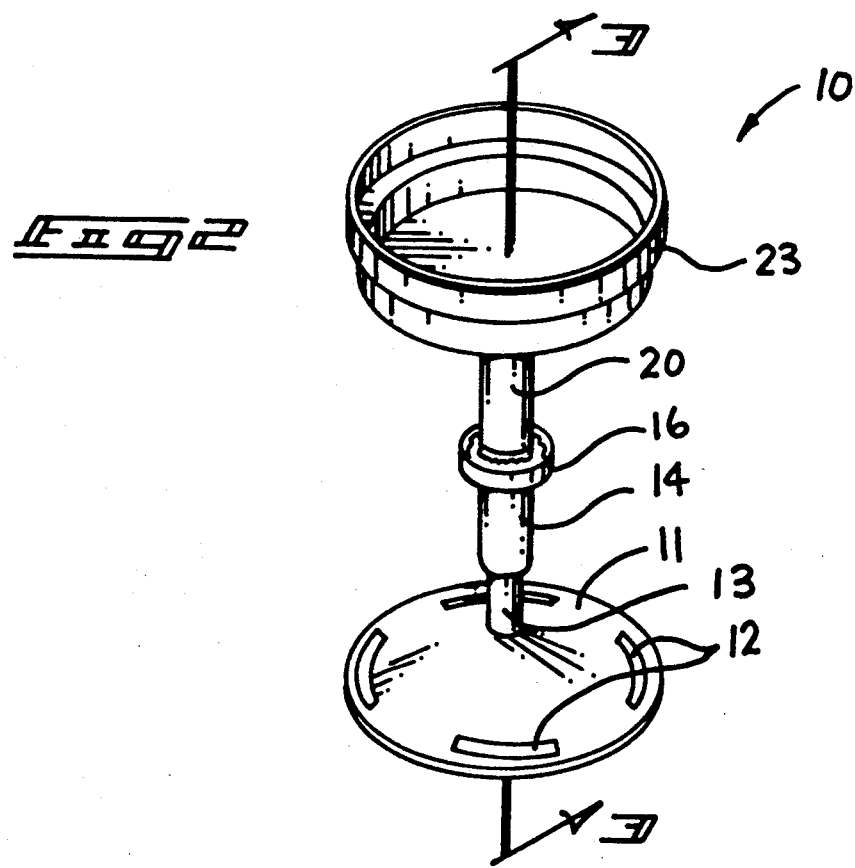
FIG. 2 is an isometric illustration of the instant invention.
Figure 7:
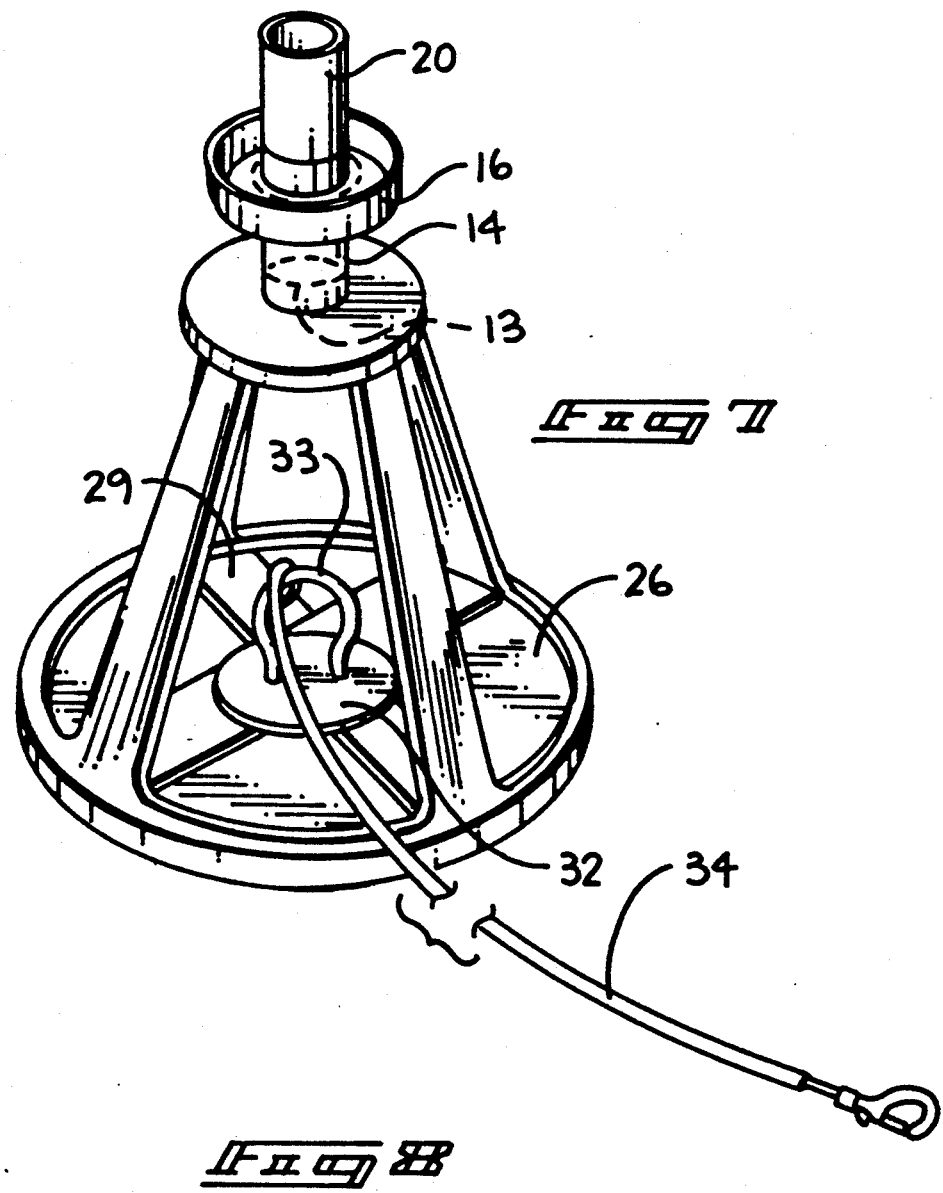
FIG. 7 is an isometric illustration of the modified base utilized by the invention.

With reference now to the drawings, and in particular to FIGS. 1 to 8 thereof, a new and improved ant proof pet feeder apparatus embodying the principles and concepts of the present invention and generally designated by the reference numeral 10 will be described.

FIG. 1 illustrates a prior art feed bowl or use by pets, wherein an elevated bowl positioned at an upper end of a post portion includes an underlying flat circular disc, with a moat positioned therebelow, to include a sticky substance mounted on the disc positioned within the moat to discourage insects and their traverse to the upper bowl.

More specifically, the ant proof pet feeder apparatus 10 of the instant invention essentially comprises a base member 11, including a plurality of circumferentially oriented stabilizer weight strips 12 mounted to the base member 11, with a base tube 13 coaxially and integrally mounted to the base member 11 extending upwardly thereof. A first support tube 14 telescopingly receives the base tube 13 therewithin (see FIG. 3) and extends upwardly from a first tube lower terminal end to a first tube upper terminal end. The first tube includes an abutment flange 15 of a generally disc-like configuration coaxially and integrally mounted to the first tube below and the first tube upper terminal end 18 to receive a torroidal fluid container 16 thereon. The torrodial container includes a central opening defined by a first diameter substantially equal to an external first diameter defined by the first tube. The fluid container 16 is positioned below the first tube upper terminal, wherein a second tube 20 includes a second tube lower terminal end 21 in abutment with an interior cylindrical wall of the torroidal fluid container 16 to position the container in alignment with the first tube and second tube 20. Upper terminal end 22 of the second tube is received within a feed disc container 23 to included a feed disc container cylindrical socket 24 to secure and align the organization in a unitary interlocking configuration.

Figure 8:
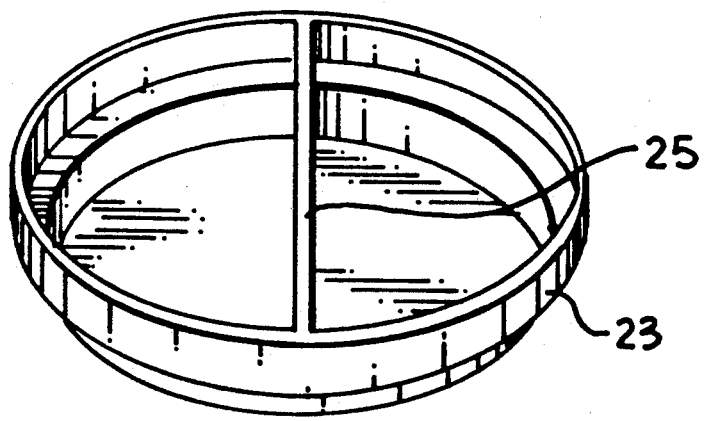
FIG. 8 is an isometric illustration of a partitioned pet food dish structure.

A modified container, as illustrated in FIG. 8, includes a diametrically aligned partition wall 25 to divide the feed bowl into a plurality of compartments for use in containing fluid and food within the same container structure 23.

The FIGS. 4-7 illustrate the use of a modified base member to include a base member plate 26 that is formed with a central aperture 27 to receive a screw coil 31 therethrough to lock the base member plate 26 to an underlying ground surface, wherein the screw coil 31 includes a coil top plate 32 fixedly and coaxially mounted to an upper terminal end of the screw coil 31, with a loop 33 projecting upwardly and fixedly mounted to a top surface of the top plate 32 to receive a tether line 34 thereon. The base member plate 26 further is formed with plural pairs of parallel ribs 28. Each pair of parallel ribs 28 defines a pocket 29 that is arranged at equal intervals on the top surface of the base plate 26 to receive the stabilizer weights 30 therewithin to enhance stabilization of the organization and readily removed for ease of disassembly of the organization for transport, storage, or maintenance of the organization in use. The modified base member plate 26 includes a plurality of upwardly extending legs, with the base tube 13 coaxially and integrally mounted to an upper terminal end of the modified base member to receive the first support tube 14, the fluid container 16, and the second support tube 20, in a manner as described with reference to the invention as set forth in the FIGS. 2 and 3.

It should be understood that the torroidal fluid container 16 receives a liquid oil and soap mixture 17 therewithin of a non-toxic composition to discourage by repulsion or entrapment of various crawling insects attempting to gain access to the overlying feed dish container 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ant proof pet feeder apparatus, comprising:
   a base member, the base member having a central axis and including a base tube fixedly mounted to the base member in a coaxilly aligned relationship and extending upwardly therefrom, and
   a first support tube, the first support tube slidably mounted on the base tube and telescopingly receiving the base tube within a lower terminal end of the first support tube, and
   the first support tube including a first support tube upper terminal end, and
   a torroidal fluid container coaxially mounted on the first support tube and spaced from the first support tube upper terminal end, and
   a second support tube telescopingly receiving the first support tube and securing the fluid container to the first support tube, and
   the second support tube including a second support tube upper terminal end, and
   a feed dish container, the feed dish container including a cylindrical socket fixedly mounted to a bottom surface of the feed dish container and receiving the second support tube upper terminal end therewithin and the cylindrical socket coaxially aligned relative to the central axis, and the first support tube includes an abutment flange orthogonally mounted to the first support tube about an exterior surface thereof and spaced below the first support upper terminal end, with the torroidal fluid container mounted upon the abutment flange, and the first support tube being defined by an external first diameter, and the torroidal fluid container including a central opening defined by a diameter equal to the first diameter, with the torroidal fluid container including an inner cylindrical wall spaced below the first support tube upper terminal end, and the second support tube including a second support tube lower terminal end, wherein the second support tube lower terminal end is arranged in abutment with the fluid container inner cylindrical wall.

2. An apparatus as set forth in claim 1 wherein the base member includes a base member plate, the base member plate being positioned below and coaxially aligned with the base tube, and the base member plate including a central aperture, and a spiral screw anchor coil, with the spiral screw anchor coil including a top plate, the screw coil being directed through the central aperture for anchoring the base member plate to an underlying surface, with the screw coil top plate in abutment with a top surface of the base member plate, and the screw coil top plate including a top plate loop, and a tether line mounted to the top loop for tethering a pet to the base member.

3. An apparatus as set forth in claim 2 wherein the base member plate includes a plurality of pairs of ribs extending upwardly from the base member plate top surface, with each pair of said plurality of ribs defining a pocket therebetween, and each pocket of each pair of ribs spaced in equal spacing on the base member plate top surface, and each pocket receiving a stabilizer weight complementarily therewithin to effect stabilizing of the base member plate relative to the feed dish container in use.

* * * * *